Figure 1:
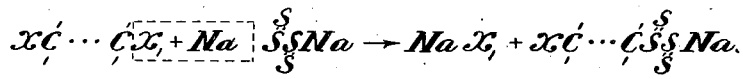

March 31, 1942.  J. C. PATRICK  2,278,127
POLYSULPHIDE POLYMERIC PRODUCT
Filed June 27, 1938

$+ 2H_2O$
↓

Inventor
Joseph C. Patrick
by Lifford, Scull & Burgess.
Atty

UNITED STATES PATENT OFFICE 2,278,127

POLYSULPHIDE POLYMERIC PRODUCT

Joseph C. Patrick, Morrisville, Pa., assignor to Thiokol Corporation, Trenton, N. J., a corporation of Delaware Application June 27, 1938, Serial No. 216,088

28 Claims. (Cl. 260—42)

This invention relates to polymers and plastics.

One object is to produce synthetic rubber and plastic compositions having improved utility in respect of resistance to solvents, heat, oxygen, heat and oxygen, actinic radiation, and other deteriorating influences.

Another object is to produce compositions having improved mechanical properties, such as the property of being readily masticated and mixed with various compounding ingredients in suitable machinery.

Another object is to attain a high degree of mechanical strength and resistance to rupture and abrasion.

The means of attaining these and other objects will appear from the following specification and drawing annexed thereto and forming a part thereof.

The raw materials of the invention include on the one hand the well known substance identified as polymerized butadiene which is a polymer of the hydrocarbon $CH_2=CH-CH=CH_2$ and on the other hand substances which may be defined as substantially polymers of the unit $$[-R-S_{2 \text{ to } 6}-]$$

where R is an organic radical having the skeleton structure

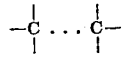

which represents carbon atoms which are separated by intervening structure.

It has been found that by combining polymerized butadiene with said polymers of the unit $[-R-S_{2 \text{ to } 6}-]$ new compounds are obtained having valuable properties which are not the mere sum of the properties of the separate components.

Butadiene polymers in general are difficult to work, as, for example, by compounding with various ingredients including carbon black and other filling and strengthening or extending ingredients. It has been discovered, however, that if the butadiene polymers are incorporated with compounds which are substantially polymers of the said unit $-R-S_{2 \text{ to } 6}-$, the result of this incorporation is a new compound which can be satisfactorily worked up. Another advantage of the present invention is that a combination of polymers of the unit $-R-S_{2 \text{ to } 6}-$ and polymerized butadiene produces a compound having increased resistance to solvents, ageing, sunlight, heat and abrasion.

For example, polymerized butadiene is severely deteriorated by the action of benzol, toluol, carbon tetrachloride, aromatic tars and tar distillates, and vegetable and animal fats, and is substantially deteriorated by petroleum solvents, such as gasoline, lubricating oils, etc. By incorporating polymerized butadiene with polymers of the unit $-R-S_{2 \text{ to } 6}-$, as herein set forth, and curing the product of the incorporation by heat, cured products are obtained having a satisfactory resistance to the solvents mentioned, as well as resistance to ageing, sunlight, heat and abrasion.

Again, polymerized butadiene is commonly cured by heating with sulphur, but the cured products "bloom" rather badly, due to the migration of free sulphur to the surface of the cured product. If instead of sulphur, a polysulphide polymer, for example a tri-, tetra-, penta- or hexa-sulphide polymer is used, together with a vulcanization accelerator, a cured product may be obtained free from the phenomenon of "blooming" and possessing marked stability to deteriorating influences such as sunlight, heat combined with oxygen, et cetera. The polysulphide polymer acts as a vulcanizing agent. Free sulphur does not migrate to the surface of the cured product, the latter is not subject to the phenomenon of "blooming" and moreover possesses remarkable stability toward deteriorating influences, including heat, oxygen, sunlight et cetera.

There are numerous classes and species of polysulphide polymers, the use of which, incorporated with polymerized butadiene, produce products having special advantages. For example, there is a class of polysulphide polymers having the general formula $$[-R-S_2-]$$

Then there are the reaction products of said $[-R-S_2-]$ polymers with compounds having the formula $$X.R'.X'$$

where R' has the same definition as that given above.

Where the primary consideration is the highest possible mechanical strength and elasticity, it is preferred to use said $[-R-S_2-]$ or disulphide polymers for incorporation with polymerized butadiene.

Where, however, the primary consideration is resistance to solvents and deteriorating influences, such as sunlight, air, heat, et cetera, and freedom from sulphur "bloom", polymers of the unit

[—R—S$_3$ to $_6$—]

are preferably used. Here again a wide variety of such polymers is available and special advantages have been discovered to be obtainable by using certain classes and species of polysulphide polymers. For example, if not only freedom from sulphur bloom and resistance to solvents and deteriorating influences, but also a high degree of elasticity and mechanical strength is desired, it is recommended to use a polymer where R has the skeleton structure

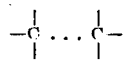

representing carbon atoms separated by intervening structure, e. g., ether linkage or unsaturated carbon atoms.

The use of various classes of polysulphide polymers incorporated with polymerized butadiene and the advantage thereof will be illustrated by reference to the following table. The properties represented are those of compounds cured as hereinafter set forth.

obtained by proceeding in the above example, but omitting the [—R—S$_2$—] polymer) has far greater resistance to deteriorating influence such as sunlight, oxygen, ozone and the combination of atmospheric oxygen and heat.

Another substantial advantage resulting from the use of the R—S$_2$— and other polysulphide polymers in combination with polymerized butadiene is the fact that whereas most, if not all, of the butadiene polymers are extremely refractory and difficult to work on ordinary rubber machinery, the addition of even the small proportion of the polymer polysulphide very materially increases the workability of the resultant compound. This greatly increased workability is surprising and could not be predicted from the independent properties of the polysulphide polymers and polymerized butadiene, respectively, because the polysulphide polymers are themselves refractory.

EXAMPLE 2

*Compound A*

| | Parts by weight |
|---|---|
| Rubber-like butadiene polymer | 100 |
| Soft carbon black | 50 |
| Zinc oxide | 5 |
| Stearic acid | 2 |
| Sulphur | 2 |
| Mercapto benzothiazole | 1 |

*Table I*

| | Polymerized butadiene alone; see Example 2, Compound A | Tetrasulphide polymer alone; see Examples 5 and 6 | 100 parts of tetrasulphide polymer, 100 parts of polymerized butadiene; see Example 2 | 100 parts of disulphide polymer, 2 parts of polymerized butadiene; see Example 3 | 3 parts of tetrasulphide polymer, 100 parts of polymerized butadiene; see Example 4 |
|---|---|---|---|---|---|
| Tensile strength: pounds per square inch | 3,600 | 1,000 | 3,100 | 2,100 | 4,000 |
| Elongation | 600 | 400 | 600 | 550 | 650 |
| Linear swell after exposure to gasoline percent | 14 | 3 | 3 | 2 | 13–14 |
| Decrease in elongation after the hot kerosene test percent | 50 | 25 | None | 10 | 10–15 |

Details to serve as a guide in obtaining compounds having special properties will be illustrated below.

EXAMPLE 1

Incorporation of polymerized butadiene with a compound which is substantially a polymer of the unit RS$_2$ where R is an organic radical having at least two carbon atoms separated by structure characterized by the presence of an ether or ether-like linkage.

The said RS$_2$ polymer is made as in Examples 7 and 8 below.

The said polymer is incorporated with polymerized butadiene and other compounding ingredients on a rubber mixing roll or in a masticator to produce a product having the following formula:

| | Parts by weight |
|---|---|
| Polymerized butadiene | 100 |
| Polymer produced as in Examples 7 and 8 | 5 |
| Carbon black | 60 |
| Zinc oxide | 5 |
| Pine tar | 3 |
| Stearic acid | 2 |
| Sulphur | 2 |
| Benzothiazyl disulphide | 1 |

This stock was cured 30 minutes at 238° F. The tensile strength was 4,000 lbs; elongation 580%

This tensile strength and elongation are both higher than is true of polymerized butadiene cured as in the above example, with the omission of the [—R—S$_2$—] polymer. Moreover, the compound produced (in comparison with that

*Compound B*

| | Parts by weight |
|---|---|
| Polymer produced as in Example 5 | 100 |
| Soft carbon black | 50 |
| Zinc oxide | 8 |

The two mixes are compounded separately. After each has been thoroughly masticated, a final compound is made, using 100 parts by weight of compound A and 100 parts by weight of Compound B, the two compounds being thoroughly mixed and masticated together on the rubber rollers. The reason for making each of these compounds separately is that in many cases better dispersion of the pigments is obtained when the above procedure is followed. Both of the compounds were tough and difficult to work, but when combined a smooth roll was obtained on the mill and the resultant compound had excellent tubing qualities. This blended stock was cured for thirty minutes at a temperature of 298° F. When tested, its tensile strength was 3100 lbs. to the square inch and its elongation was 600%. When immersed in gasoline at a temperature of 120° F. for a period of ten days, the test piece had undergone a linear swell of only 3%, whereas the corresponding Compound A utilizing the butadiene polymer alone had undergone an increase in linear swell of 14%.

When immersed in kerosene for ten days at a temperature of 158° F. its surface was unaffected and its physical properties were substantially unchanged, whereas the corresponding butadiene polymer compounded as shown in A and cured as above under the same conditions had undergone a decrease of elongation of 50% and the surface was definitely softened.

In Compound B given above, in which the polysulphide polymer was used alone, the tensile strength was found to be 1000 lbs. per square inch and the elongation 400%. When subjected to the above tests, the cured product of Compound B underwent in the gasoline a linear swell of 3%, and in the kerosene test underwent about 25% decrease in elongation, and the tensile strength remained the same. Therefore it is plain that the properties of the compounds produced as in Example 2 by incorporating the polymerized butadiene with the polysulphide polymer are not the mere aggregation of the properties of the respective components and could not be predicted by the known properties of the said compounds.

EXAMPLE 3

Compound A

| | Parts by weight |
|---|---|
| Polymer produced as in Example 9 | 100 |
| Soft carbon black | 60 |
| Zinc oxide | 7 |
| Stearic acid | 1 |
| Benzothiazyl disulphide | 1 |

This compound, when mixed on the rubber mill, is refractory and difficult to process, although the product resulting therefrom, when cured for fifty minutes at 298° F. has valuable properties as regards resistance to severe solvents, such as benzol, toluol, and lacquer solvents such as esters, alcohols, turpentine, et cetera.

Compound B was made exactly as in the case of Compound A except that two parts of polymerized butadiene were incorporated in the compound or the mixing mills. Compound B was milled and extruded from the tubing machines with extreme ease and showed none of the refractory qualities referred to under Compound A. When the resulting product was cured as above for fifty minutes at 298° F. it showed the same high resistance to the solvents enumerated, without any diminution whatever. The properties of the composite product are shown in the above table.

The result is surprising, both as to the effect obtained by the relatively small proportion of the polymerized butadiene, as well as from the fact that the butadiene polymer alone is itself extremely difficult to process. Also a compound of the butadiene polymer alone would be extremely susceptible to the type of solvents enumerated in this case.

EXAMPLE 4

Compound A

| | Parts by weight |
|---|---|
| Polymerized butadiene | 100 |
| Carbon black | 40 |
| Zinc oxide | 8 |
| Pine tar | 3 |
| Stearic acid | 2 |
| Sulphur | 3 |
| Benzothiazyl disulphide | 1 |

A Compound B was made identical with Compound A except instead of sulphur, three parts of a tetrasulphide polymer, which may be made by the interaction of sodium tetrasulphide and propylene dichloride, was used. Stock A was difficult to compound, being rather tough and "nervy." When cured for thirty minutes at 298° F. it showed a tensile strength of about 3600 lbs. per square inch and an elongation of 600%. At the end of thirty days, definite signs of sulphur bloom could be noted on the surface of the sheets of the compound stock and the uncured compound showed blooming in five days.

Compound B worked with extreme ease on the rubber mill, was not tough and showed a very satisfactory absence of "nerve." When cured for fifty minutes at 298° F. it gave a tensile strength of about 4000 lbs. per square inch and 650% elongation. When cured sheets from the two compounds were exposed to a stream of air at a temperature of 70° C. for two weeks, the product of Compound A showed a tensile strength of only 3000 lbs. to the square inch and an elongation of 400%, whereas the sheet cured from Compound B showed 3900 lbs. tensile strength and 620% elongation. That is to say, the loss in tensile elongation was very markedly less in the case of the butadiene compound cured without the use of free sulphur, substituting therefor the organic tetrasulphide.

In accordance with this invention, the compound of polymerized butadiene and polymer of the unit [—R—$S_{2\ to\ 6}$—] contains not only these two components but also an oxidizing agent and preferably also a vulcanization accelerator and an organic acid. The oxidizing agent may include a metallic oxide, e. g., an oxide of zinc, lead, bismuth, arsenic, antimony, etc., an oxidizing salt, e. g., a perborate or chromate or an organic oxidizing agent, e. g., benzoyl peroxide or an aromatic mono or poly nitro compound. The vulcanization or curing accelerator may include benzo thiazyl disulphide, tetramethyl thiuram disulphide, mercapto benzo thiazole, diphenyl guanidine and other organic vulcanization accelerators. The organic acid may include stearic acid, benzoic acid and numerous other organic acids. The use of these several types of compounding ingredients has been illustrated by the above examples.

In view of the numerous classes and species of compounds which are substantially polymers of the unit [—R—$S_{2\ to\ 6}$—] it will be necessary to go into considerable explanation and detail to demonstrate the meaning and scope of said formula and this will now be done.

Polymers of the unit [—R—$S_{2\ to\ 6}$—] may be obtained by at least two routes or reactions, (1) by reaction between an alkaline polysulphide and an organic compound having at least two carbon atoms and substituents attached to each of said two carbon atoms and (2) by the oxidation of an organic compound having at least two carbon atoms and an —SH group attached to each of said carbon atoms.

The mechanism of said reactions will now be described, reference being had to the accompanying drawing, in which Figs. 1 to 6 show the mechanism of the polysulphide reaction.

In the polysulphide reaction an alkaline polysulphide is employed which may be derived by the reaction of sulphur with a member of the group consisting of alkali and alkaline earth metals, ammonia and amines, e. g., sodium, potassium, lithium, caesium, etc., barium, calcium, strontium, etc., ammonia and ethanolamines and the polysulphide may be a disulphide, trisulphide, tetrasulphide, pentasulphide or hexasulphide, e. g., $Na_2S_x$ where $x$ is an integer of 2 to 6.

In the polysulphide reaction the molecules of the organic substance become joined together to form a complex pattern or chain, i. e., the relatively small molecules of the organic substance are joined together to form a very large molecule or polymer. This joinder takes place through the medium of the sulphur in the polysulphide. This sulphur acts as a sort of bridge from one molecule to the next. As a result, the reaction products have high percentages of sulphur. They also have colloidal properties.

Reaction A (see the drawing) occurs because the Na (sodium) unites with the X' atom or radical, i. e., splits off the said X' atom or radical from the compound

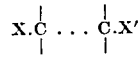

This causes the group

to take the place of X' and a new compound is formed as shown in Equation A. This reaction may be classified in chemistry as a saponification reaction.

In reactions A and B above, X and X' are respectively any substituents which can be split off by treatment with an alkaline substance, e. g., halogen, acid sulphate, nitrate, acid phosphate, bicarbonate, formate, acetate, propionate, laurate, oleate, stearate, oxalate, acid malonate, acid tartrate, acid citrate, etc.

As a result of reaction A, a molecule is produced having a replaceable substituent attached to one carbon atom, and a sodium polysulphide radical

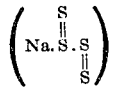

atom attached to another carbon atom.

Figure 2:
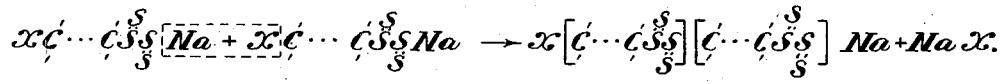

Owing to the capacity of the sodium to unite with the said replaceable substituent, the compound produced in Equation A has the remarkable ability of uniting with itself, as shown in Equation B. (Fig. 2.)

Moreover, the compound produced as shown in Equation B unites with itself in the same manner and this continues until the size of the molecule is so large that its sluggishness prevents further condensation or self-union. See Fig. 3.

This ability requires the existence of a sodium polysulphide radical (or its equivalent) on one carbon atom and a replaceable substituent on another carbon atom of the same compound.

If this rule is observed, union of the compound containing said pair of carbon atoms to form a compound containing a tetrad or quartet of carbon atoms does not exhaust the reaction because each terminal carbon atom of this quartet will also have attached thereto, respectively, a replaceable substituent and a sodium polysulphide radical, so that the quartet or tetrad can form an octad, etcetera.

This permits a building up of a carbon chain in geometrical progression starting with a compound containing (but not necessarily consisting of) two carbon atoms.

The fundamental requirement is that the starting compound shall have at least two carbon atoms and at least two substituents attached to said carbon atoms, respectively, which substituents are ultimately split off. Reaction of this compound with sodium polysulphide replaces one of these substituents with a sodium polysulphide radical as set forth in Equation A and produces a compound having one of said substituents on one carbon atom and a sodium polysulphide radical on another carbon atom.

The unit of the chain is the said pair of carbon atoms plus a group of sulphur atoms, thus:

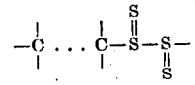

where the group of sulphur atoms is the tetrasulphide group. This group may be the disulphide group —S—S—, the trisulphide group

the tetrasulphide group shown, the pentasulphide group

or the hexasulphide group

depending upon whether an alkaline disulphide, trisulphide, tetrasulphide, pentasulphide or hexasulphide is used. With this explanation the reaction can be regarded from the mechanical point of view and it is clearest when so regarded. The said unit can be likened to a unit building block with at least two interlocking members on each unit. For example, one of these members may have a male thread and the other a female thread. The male member on one unit can then engage the female member on another unit, so as to build up a chain or complex structure. There must be at least two of such interlocking members on each unit. Otherwise the length of the chain is limited to a union of two elements.

Figure 3:
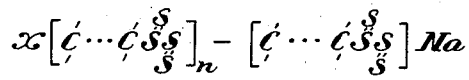
Figure 4:
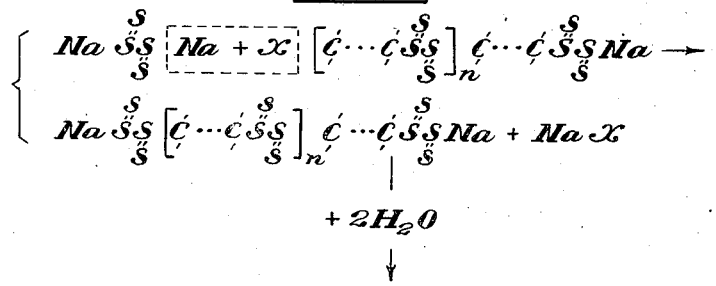
Figure 5:
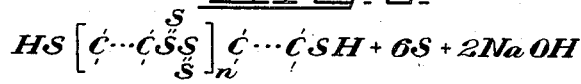

Referring now to the diagram, the compound shown as produced in reaction B continues to unite with itself until a long chain is built up having the formula shown at C. (Fig. 3.) This then loses its X terminal and acquires SH terminals at each end by hydrolysis, as shown in Equations D and E. At this stage the condensing or polymerizing action of the polysulphide substantially ceases. (Figs. 4 and 5.)

It is desirable to carry out the above reaction in an alkaline dispersion medium as specifically illustrated in Example 5 below, and to produce the polymer at the above-mentioned stage in the form of a latex-like liquid from which the polymer may be separated by various means, e. g., coagulation produced by the addition of acid. This latex has the property of mixing intimately with water without dissolving therein and may therefore be washed thoroughly to remove soluble impurities.

Notwithstanding the large size of the molecule produced as indicated at E, further increase in size may be caused by employing oxidation, preferably while the product is still in the dispersed form and prior to the curing step, i. e., while the polymer is still in the intermediate stage. This may be done by blowing air through the dispersion, provided it is definitely alkaline, or by employing any of a number of oxidizing agents effective under alkaline conditions, such as hydrogen peroxide, benzoyl peroxide, sodium, potassium, barium and calcium peroxides, perborates, permanganates, chromates and dichromates, etc.

When oxidized the polymer shown at E condenses as indicated by Equation F in the diagram.

Alkaline polysulphides are themselves oxidizing agents provided an excess be employed over the equimolecular proportions shown in Equations A to E inclusive.

It is generally desirable to increase the size of the molecule as much as possible in the intermediate stage, because this in conjunction with the subsequent curing after incorporation with polymerized butadiene tends to develop the desirable qualities of mechanical strength, elasticity, resistance to chemicals and solvents, etc., to the highest degree.

Proof that the reaction producing the

polymer occurs by the mechanism shown and that the products obtained have the formulae shown include the following:

(a) Taking BB' dichlorinated ethyl ether as an example, the chlorine of the compound appears quantitatively in the form of sodium chloride as a by-product.

(b) After isolating the polymer from the soluble by-products the weight of the polymer is quantitatively equal to the weight of the dichlorinated ether minus the halogen plus the sulphur from the alkaline polysulphide.

(c) The proportion of sulphur in the polymer is equal to that in the following formula:

$$[C_2H_4.O.C_2H_4.S_4]$$

(d) Attempts to determine molecular weight of the polymer shows that it is very high. This is substantiated by the properties as herein described.

(e) A polymer having properties identical with those obtained by reacting dihalogenated ethyl ether with sodium tetrasulphide can be obtained by an entirely different route, as shown by the following equations, which illustrate the mercaptan reaction mentioned above:

(1)   $2(HS.R.SH) + O = HS.R.S.S.R.SH$ where $R = -C_2H_4.O.C_2H_4-$.

The above dimercapto ether is obtained by reaction BB' dichlorethyl ether with sodium hydrosulphide NaSH.

(2)   $2(HS.R.S.S.R.SH) + O =$
   $HS.R.S.S.R.S.S.R.S.S.R.SH$

Figure 6:
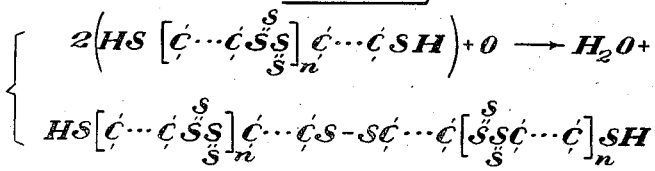

This continues until a polymer is built up having the formula (3)   $HS.(RSS)_nR.SH$ This on further oxidation gives (4)   $HS.(RSS)_nR.S.S.R(RSS)_nHS$ The above compound (4) reacts with sulphur to produce a product identical with that shown in Equation F, Fig. 6, in the diagram and conversely the product shown in Equation F can be partially desulphurized to produce a product identical with that shown at (4) above.

The above mercaptan reaction shows that the linkage between the organic carbon radicals is through a sulphur bridge.

(f) X-ray examination shows that the distance between the carbon radicals is equal to the sum of the diameters of two sulphur atoms.

The two sulphur atoms referred to are bound firmly and form the direct bridge between the carbon radicals whereas the remaining sulphur atoms are in labile form and may be removed by a partial desulphurizing action as already mentioned.

This labile sulphur is of great value in the reaction of the polymers containing it, with polymerized butadiene.

In the formula shown in Equation F, the value of $n$ is so great that the product is substantially and practically a polymer of the unit

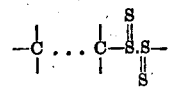

and the product reacts as such. For example, three mols of this unit react with two mols of sodium suphide according to the following equation:

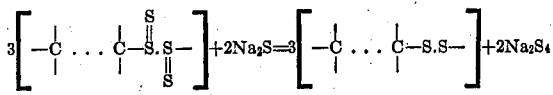

and the resulting product is identical in all its properties with the product produced by oxidation of a polyfunctional mercaptan as shown in Equations 1 to 4 above.

Conversely, the polymer shown in Equation 4 above as produced by oxidation of a polyfunctional mercaptan behaves substantially as a polymer of the unit

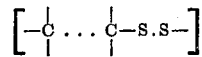

A mol of this unit will react with two atoms of sulphur as follows:

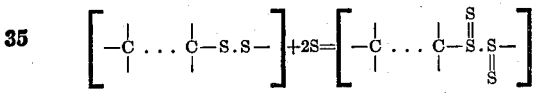

and the product obtained is identical in all its properties with that shown in Equation F in the diagram.

This is further proof that the organic radicals in the polymer, i. e., the carbon radicals, are joined together through a bridge of two sulphur atoms. This bridge is in firm chemical combination, whereas the remaining sulphur atoms in the polysulphide polymer are in labile condition and may be removed by partial desulphurizing agents, such as alkaline monosulphides, alkalies including NaOH and KOH and sulphites. The tri-, tetra-, penta- and hexasulphides react with polymerized butadiene and cause curing or vulcanization thereof without the need of any extraneous sulphur.

In the above equations, instead of the tetrasulphides, the di-, tri-, penta- and hexasulphides similarly react.

The fundamental requirement for the reactions shown in Figs. 1 to 6 of the drawing is an organic compound having at least two carbon atoms and a substituent attached to each of said carbon atoms, which substituent is replaceable, i. e., is split off during the reactions which occur when said compound is reacted with an alkaline polysulphide.

For the mercaptan reaction it is necessary to have an organic compound having at least two carbon atoms and an —SH group attached to each of said carbon atoms, thus

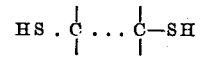

These carbon atoms may be adjacent or separated by intervening structure.

Compounds produced by the polysulphide reaction shown in Figs. 1 to 6 are substantially polymers of the unit

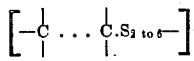

Compounds produced by the mercaptan route are substantially polymers of the unit

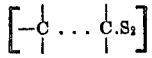

Polymers of the unit

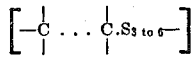

contain labile sulphur upon removal of which, as by reaction with reducing or desulphurizing agents, they are converted to polymers of the unit

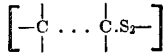

and conversely the latter can be converted into the former by reaction with one to four atomic weights of sulphur for each molecular weight of said unit.

It has been discovered that when the space between the adjacent carbon atoms in the formula

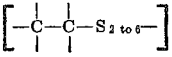

is opened up and intervening structure inserted there between polymers of the unit

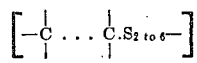

are produced where

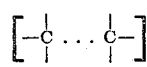

represent carbon atoms separated by intervening structure.

As already stated, the reaction involving the use of an alkaline polysulphide requires the selection of an organic compound having at least two carbon atoms and a substituent attached to each of said carbon atoms which substituent is split off during the reaction. If a compound be selected containing two carbon atoms and an —SH group attached to each, a disulphide organic polymer is produced by oxidation. The said carbon atoms for the sake of reference will be called the reactive carbon atoms.

The mechanism of the polysulphide and mercaptan reactions is the same whether or not there is intervening structure between said reactive carbon atoms. That mechanism and the structure of the polymers which may be produced by the specific polysulphide or mercaptan reaction has been fully explained herein and it will therefore be clear that whether or not there is intervening structure between the reactive carbon atoms, the general formula of the polymers is substantially

[—RS₂ to ₆—]

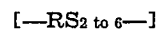

where R has the carbon structure already explained.

All intervening structure between said reactive carbon atoms modifies, however, the character of the polymers obtained, as compared with the polymers produced from compounds having no intervening structure between said reactive carbon atoms and the present invention involves the concept of providing intervening structure between said reactive carbon atoms and incorporating the resulting polymers with polymerized butadiene.

As a result of the application of this concept, composite polymers can be produced having a variety of special properties for special uses, as already described. The invention will be further described by illustrating the production and properties of polymers of the unit

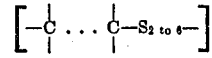

where the intervening structure between the pair of reactive carbon atoms is selected from the following classes, it being understood that other intervening structure may be employed:

Ether linkage
Unsaturated carbon atoms
Aromatic structure
Saturated straight chain carbon atoms
Saturated branched chain carbon atoms.

*Where the intervening structure is or contains an ether linkage*

When the said pair of carbon atoms are joined to and separated by intervening atomic structure characterized by an ether linkage, certain important advantages are obtained. These advantages relate particularly to the polymer in its final form, i. e., the form produced by incorporating the polymer in its intermediate stage with polymerized butadiene and curing the product. These advantages are in general characterized by a combination of the following properties: elasticity, mechanical strength, retention of these properties at low temperatures, insolubility in common solvents and resistance to distortion by heat.

A specific example, for the purpose of illustration, of one method of obtaining a polymer of the unit

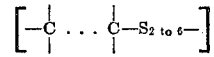

where

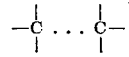

represents two carbon atoms separated by intervening structure characterized by an ether linkage is a reaction between ΒΒ′ dihalogenated ethyl ether and sodium tetrasulphide. The polymer produced is substantially a polymer of the unit

[—C₂H₄.O.C₂H₄—S₄]

S may be S₃, S₄, S₅ or S₆, depending on whether an alkaline tri-, tetra-, penta- or hexasulphide is used.

By reacting the polymer with a reducing or desulphurizing agent, i. e., an agent capable of combining with sulphur, as more fully set forth in my copending application Serial No. 28,614, filed June 27, 1935, the labile sulphur may be removed and the polymer converted thereby into a polymer of the unit

[—C₂H₄.O.C₂H₄—S₂]

and this may be converted back from its disulphide form to the corresponding polysulphide form by heating or reacting one mol of said unit with one, two, three or four atomic weights of sulphur.

Moreover, a polymer of the unit

[—C₂H₄.O.C₂H₄—S₂]

may be obtained by a different reaction, i. e., by oxidizing ΒΒ′ dimercapto ethyl ether. The disulphide polymers have certain advantages over the polysulphide polymers.

The general formula for polymers of the unit

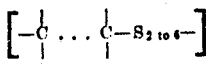

where

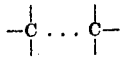

represents carbon atoms separated by and joined to structure characterized by an ether linkage is

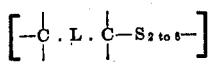

where L represents an oxygen atom or the group —R.O.R'—, R and R' being respectively alkyl, aralkyl or aryl radicals.

The reaction between sodium tetrasulphide and BB' dihalogenated ethyl ether will now be described in detail, it being understood that instead of halogens, numerous other substituents could be used (e. g., acid sulphate, acid phosphate, formate, acetate, propionate, acid tartrate, etc.), which substituents, like halogen, are split off during the reaction. The halogen substituent, specifically chlorine, is used because of economic reasons.

EXAMPLE 5

Into a closed reaction tank suitably equipped with stirring means, pipe coils for steam and cold water and a thermometer, are placed 2000 liters of 3-molar sodium tetrasulphide solution. To the polysulphide solution are added with vigorous agitation, 10 kilograms of caustic soda dissolved in 15 liters of water. This is followed by the addition of 25 kilograms of crystallized magnesium chloride (MgCl$_2$.6H$_2$O) dissolved in 20 liters of water.

The polysulphide mix is heated to about 135° F. and about 700 kilograms (5 kilogram mols of BB' dichlor ethyl ether are added gradually over a period of about three hours. The rate of addition of the dichloro ether is so regulated as to prevent the temperature of the reaction from going above about 210° F. during the reaction.

When all the chloro ether has been added and the temperature shows a tendency to drop, steam may be admitted to the heating coils and so regulated as to maintain a temperature of from 215° to 220° F. for about three hours during which time the latex-like dispersion of the polymer is constantly stirred or agitated. The heating step just described is carried out in order that the excess of polysulphide over that actually required to decompose the dichloro ether may exert a condensing or polymerizing effect on the reaction product as first formed, as illustrated in Equation F of the annexed drawing.

The finely divided latex-like dispersion of the polymer may now be freed from water-soluble impurities by any suitable means, such as filtration and repeated washing with water, or it may be washed by repeated settling of the particles and removal of supernatant liquid, followed by re-suspension in clean water and repetition of the settling process. The washed latex-like dispersion may now be used in the dispersed form or it may be separated from excess water by filtration and drying to give an elastic mass; or it may be treated with sufficient dilute acid, for example dilute hydrochloric, sulphuric or acetic acid, to confer a slight acidity on the latex-like dispersion, whereupon coagulation occurs. The coagulum can be freed from adherent and occluded water by mastication or kneading on rolls or by prolonged drying or by subjecting to pressure.

It will be noted that in the above example six kilogram mols of the polysulphide were used whereas only about five kilogram mols of the organic reactant were used, leaving about 20 molar per cent excess of the polysulphide. This procedure provides an excess of polysulphide over that required for decomposition of the organic compound and this excess is available for the second step which results in further polymerization of the product due to the oxidizing effect of the excess polysulphide on the finely divided reaction product during the prolonged heating period.

Equimolecular proportions of the organic reactant could be used with the polysulphide and after the saponification is complete an additional treatment with more polysulphide could be made. Moreover, the latex could be washed and then further polymerized, e. g., by treatment with a current of air in an alkaline medium. Substantially the same result is obtained finally but the method given is considered the most convenient and economical, especially in view of the fact that the excess of polysulphide can be recovered if desired.

In the above Example 5, instead of BB' dichloro-ethyl ether, any member selected from the following list can be employed, using the same molecular proportions:

Table II

CH$_3$.CHX.O.CHX'.CH$_3$

AA' disubstituted ethyl ether

X.C$_2$H$_4$.O.C$_2$H$_4$.X'

BB' disubstituted ethyl ether

X.CH$_2$.O.CH$_2$.X'

Disubstituted methyl ether

X.C$_2$H$_4$O.C$_2$H$_4$.O.C$_2$H$_4$.X'

Disubstituted ethoxy ethyl ether

X.C$_2$H$_4$.S.C$_2$H$_4$.X'

Disubstituted thio ethyl ether

X.CH$_2$.S.CH$_2$.X'

Disubstituted thio methyl ether $$\text{X.CH}_2\text{.O.CH}_2\text{.}\underset{\underset{\text{CH}_3}{|}}{\overset{\overset{\text{CH}_3}{|}}{\text{C}}}\text{.CH}_2\text{.OCH}_2\text{.X'}$$

Disubstituted 1,3 methoxy, 2,2 dimethyl propane

X.CH$_2$.CH$_2$.CH$_2$.O.CH$_2$.O.CH$_2$.CH$_2$.CH$_2$X'

Disubstituted dipropyl formal

X.CH$_2$.CH$_2$.O.CH$_2$.O.CH$_2$.CH$_2$.X'

Disubstituted diethyl formal

X.CH$_2$O.CH$_2$.CH.OCH$_3$
         |
         X'

Disubstituted dimethoxy ethane

X.CH$_2$.CH$_2$.O—⬡—O.CH$_2$.CH$_2$.X'

Disubstituted para diethoxy benzene

X.CH$_2$O.CH$_2$.CH$_2$.OCH$_2$.X'

Disubstituted dimethoxy ethane

X.CH$_2$.CH$_2$.CH$_2$.S.CH$_2$.CH$_2$.CH$_2$.X'

Disubstituted dipropyl thio ether

X.CH₂.CH₂.O.C.O.CH₂.CH₂.X'
           ‖
           O

Disubstituted diethyl carbonate

O                    O
         ‖                    ‖
X.CH₂.C O.CH₂.CH₂.O C.CH₂.X'

Disubstituted glycol diacetate

O                        O
           ‖                        ‖
X.CH₂.CH₂.C O.CH₂.CH₂.CH₂.O C.CH₂.CH₂.X'

Disubstituted trimethylene glycol dipropionate

X—⟨ ⟩—O—⟨ ⟩—X' pp' Disubstituted diphenyl ether

X—⟨ ⟩—O—CH₂X'

Disubstituted anisole

X—⟨ ⟩—CH₂.O.CH₂—⟨ ⟩—X'

Disubstituted dibenzyl ether

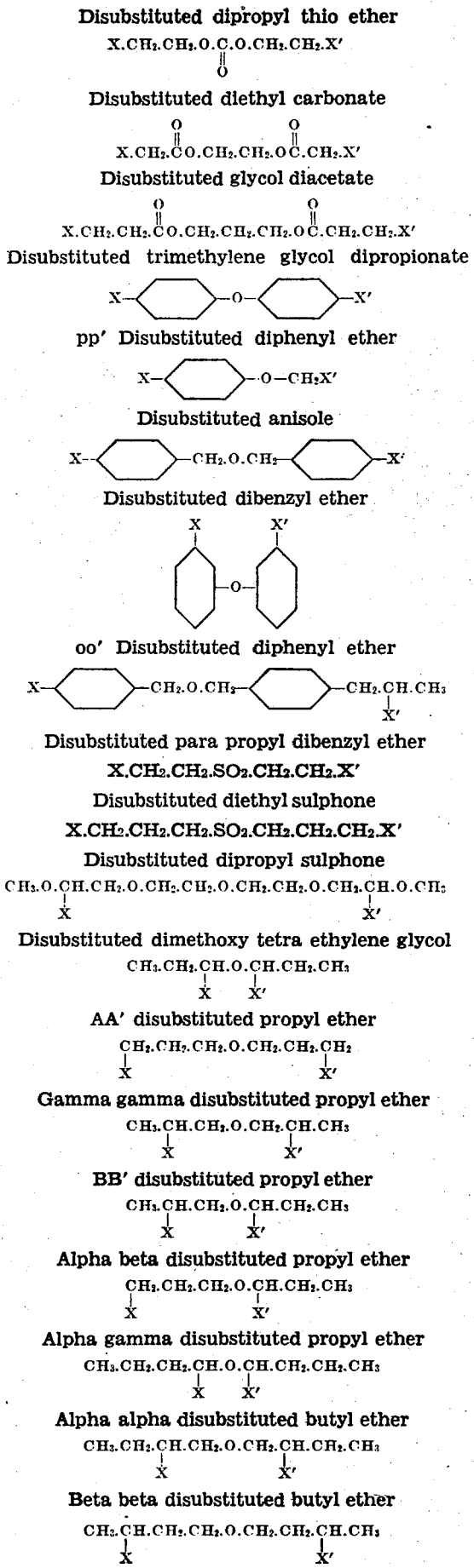

oo' Disubstituted diphenyl ether

X—⟨ ⟩—CH₂.O.CH₂—⟨ ⟩—CH₂.CH.CH₃
                              |
                              X'

Disubstituted para propyl dibenzyl ether

X.CH₂.CH₂.SO₂.CH₂.CH₂.X'

Disubstituted diethyl sulphone

X.CH₂.CH₂.CH₂.SO₂.CH₂.CH₂.CH₂.X'

Disubstituted dipropyl sulphone

CH₃.O.CH.CH₂.O.CH₂.CH₂.O.CH₂.CH₂.O.CH₂.CH.O.CH₃
       |                                    |
       X                                    X'

Disubstituted dimethoxy tetra ethylene glycol

CH₃.CH₂.CH.O.CH.CH₂.CH₃
        |    |
        X    X'

AA' disubstituted propyl ether

CH₃.CH₂.CH₂.O.CH₂.CH₂.CH₂
  |                      |
  X                      X'

Gamma gamma disubstituted propyl ether

CH₃.CH.CH₂.O.CH₂.CH.CH₃
     |           |
     X           X'

BB' disubstituted propyl ether

CH₃.CH.CH₂.O.CH.CH₂.CH₃
     |        |
     X        X'

Alpha beta disubstituted propyl ether

CH₃.CH₂.CH₂.O.CH.CH₂.CH₃
  |              |
  X              X'

Alpha gamma disubstituted propyl ether

CH₃.CH₂.CH₂.CH.O.CH.CH₂.CH₂.CH₃
             |    |
             X    X'

Alpha alpha disubstituted butyl ether

CH₃.CH₂.CH.CH₂.O.CH₂.CH.CH₂.CH₃
        |            |
        X            X'

Beta beta disubstituted butyl ether

CH₃.CH.CH₂.CH₂.O.CH₂.CH₂.CH.CH₃
     |                     |
     X                     X'

Gamma gamma disubstituted butyl ether

CH₂.CH₂.CH₂.CH₂.O.CH₂.CH₂.CH₂.CH₃
 |                            |
 X                            X'

Delta delta disubstituted butyl ether

In some of the examples set forth in the above list it will be noted that the substituents which are split off are attached directly to an aromatic nucleus. The reaction is carried out as in Example 1, except that the temperature is increased as, for example, by working in an autoclave or bomb. The temperature necessary may be illustrated by the fact that in the case of pp' dichloro diphenyl ether, a temperature of about 500° F. for about one hour is necessary.

The proportion of sulphur to the polymers produced from the above compounds varies from 20 to 80 per cent, depending upon whether the sulphur in the unit $$\left[ -\overset{|}{\underset{|}{C}} \ldots \overset{|}{\underset{|}{C}} - S_x \right]$$

is a group of two, three, four, five or six sulphur atoms and also depending upon the molecular weight of the disubstituted compound.

In the above group there are found formals, esters, ethers, thioethers, sulphones, alkoxy compounds and aryloxy compounds. In all, however, there are two carbon atoms joined to and separated by structure characterized by an ether linkage. There is a common quality running through the entire series. To each of the said carbon atoms there is joined a substituent which is split off. An ether linkage is defined as an oxygen or sulphur atom functioning as a link or bridge between two adjacent carbon atoms, thus R—O—R' or R.S.R' where R and R' are carbon atoms and structure characterized by an ether linkage in the oxygen or sulphur atom itself (or structure containing said oxygen or sulphur atom) functioning in the manner described.

Owing to this common quality, the polymers produced from these compounds by reaction with an alkaline polysulphide have a number of outstanding and important properties which distinguish them from the polymers produced from disubstituted ethylene and propylene, as already described. This is particularly true after the intermediate potentially reactive polymers have been cured and the curing step will be illustrated by Example 6.

Any of the polymers produced by substituting any of the compounds in Table II for the BB' dichloroethyl ether of Example 5, may be substituted in Compound B of Example 2, for incorporation with polymerized butadiene and subsequent curing of the compound as set forth in said Example 2.

EXAMPLE 6

| | Parts by weight |
|---|---|
| Polymer produced as in Example 5 | 100.00 |
| Zinc oxide | 10.00 |
| Stearic acid | 0.05 |
| Benzothiazyl disulphide | 0.25 |
| Carbon black | 60.00 |

The above ingredients are thoroughly mixed by mastication and then the resulting compound is cured by heating to about 300° F. for about one hour. Instead of zinc oxide other oxidizing agents can be used, e. g. oxides of copper, lead, bismuth, antimony, arsenic, manganese and chromium. Organic oxidizing agents including benzoyl peroxide and organic mono and poly nitro compounds can also be used.

EXAMPLE 7

138 lbs. or 1 mol of dimercapto ethyl ether, SH.C₂H₄.O.C₂H₄.SH, are dissolved in 100 gallons sodium hydroxide sodium hydroxide solution containing 90 lbs. of NaOH; that is, an amount of NaOH slightly in excess of 2 mols. With this solution there is intimately mixed a freshly prepared suspension of magnesium hydroxide made by treating 10 lbs. of MgCl₂6H₂O with 2 gallons of water and adding thereto a solution of 4 lbs. NaOH dissolved in 0.5 gallon of water. The entire mixture is then placed in a reaction vessel provided with stirring means and also means for heating, for example, steam coils. The mixture is subjected to stirring and to this is gradually added an oxidizing agent in the form of a solution of sodium polysulphide (made, for example, by dissolving 348 lbs. or 2 mols of sodium tetra-sulphide in 100 gallons of water) during a period of about ten minutes. The reaction occurs approximately at room temperature and is somewhat exothermic. The reaction is substantially completed after all the polysulphide has been added. The polysulphide acts as an oxidizing agent and converts the dimercapto ethyl ether into a complex polymer or plastic. The completion of the reaction is indicated by withdrawing a sample, acidifying it and observing whether the odor of mercaptan is absent. Stirring may be continued until the reaction is completed as indicated by this test. This reaction produces the polymer in dispersed latex-like form, which may be purified and coagulated as in Example 5.

In Example 7 any of the disubstituted compounds herein mentioned, where X and X′ signify —SH groups, can be substituted for the dimercapto ethyl ether.

The compounds so produced are substantially polymers of the unit [—RS₂—]. They may be produced not only as shown in Example 7, but also by removing the labile sulphur from the tetrasulphide polymer produced as in Example 5. This will be specifically illustrated by the following example:

EXAMPLE 8

Proceed as in Example 5 up to but not including the step of coagulation. Add 250 kilograms (6.25 kilogram mols) of NaOH dissolved in 500 litres of water, raise the temperature to 212° F. and maintain there for about 30 minutes. Then cool, settle and proceed as in Example 5 to wash the latex and coagulate the polymer. Instead of the specific substance used in Example 8, any of the disubstituted compounds mentioned herein may be used, where X and X′ are substituents split off during the reaction, in the same molecular proportion.

Any of the polymers produced as in Examples 7 and 8 may be substituted for the —[RS₂—] polymer used in Examples 1 and 3 for incorporation with polymerized butadiene.

Another class of polysulphide polymers particularly useful for incorporation with polymerized butadiene are polymers obtained by reacting polymer of the unit [—RS₂—] with compounds having the formula X.R′.X′ where R and R′ have skeleton structure selected from the groups

and

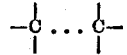

where

represent adacent carbon atoms and

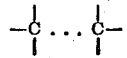

represent carbon atoms separated by intervening structure, S is a sulphur atom and X and X′ are substituents split off during the reaction. R and R′ may have the same skeleton structure but preferably different specific structure. In this way a polymer is obtained having different radicals R and R′ in the same molecule. This will be illustrated by the following example. In this example the polymer is made from BB′ dichloro ethyl ether and said polymer is then reacted with ethylene dichloride. Instead of these specific compounds, however, any of the disubstituted compounds listed herein may be substituted, different compounds being selected to make the polymer and to react it as shown, after it is formed, so that the final compound will have different radicals R and R′ in the same molecule.

EXAMPLE 9

3000 liters of 2 molar sodium tetrasulphide solution containing 6000 gram mols of Na₂S₄ are treated with 8 kilograms of NaOH followed by 20 kilograms of MgCl₂6H₂O in a reaction vessel as in Example 1. 6000 gram mols of BB′ di-chloro-ethyl ether are slowly added during about 3 hours and the temperature is maintained at about 160° F. with stirring, after which the temperature is raised to 200° F. and held there about 2 hours with agitation. The polymer formed is in the form of a latex which is settled out. The supernatant liquor is drawn off and the volume restored by adding water. Then add 6000 gram mols of NaOH and heat to about 200° F. with constant agitation and hold there about 30 minutes to effect a partial desulphurization and to activate the polymer by converting all —SH groups into —SNa groups. Then cool down to about 130° F. and add 2000 gram mols of ethylene dichloride during about half an hour, with stirring. Then raise temperature to about 200° F. and maintain there about half an hour. The product is now a coupled polymer, still in the form of a latex which is settled out from the supernatant liquor which is drawn off. The residual latex is washed twice with water with intermediate settling and drawing off of the wash water.

The resulting coupled polymer contains both disulphide and tetrasulphide groups of sulphur atoms and is subjected to a further desulphurizing treatment to complete the conversion of the organic polysulphide to the disulphide. It has been found advantageous to effect a partial desulphurizing prior to coupling, followed by a completion of the desulphurizing subsequent to coupling. The completion of the desulphurizing may be carried out by a treatment with sodium mono-, sulphide as follows:

1000 gram mols of sodium monosulphide are added to the latex, the temperature is raised to about 200° F. and held there about an hour. The coupled polymer is still in the form of a latex. It is settled, washed free from color by successive washings, drawn off into a separate vessel and coagulated by adding acid as in Example 1.

Having explained the advantages to be obtained inserting structure characterized by an ether linkage, between the carbon atoms in the unit

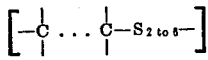

and incorporating polymers of this unit with polymerized butadiene the invention will be further described by illustrating various other kinds or classes of intervening structure.

*Intervening structure characterized by—*

A specific example for the purpose of illustration is a reaction between an alkaline polysulphide and 1,4 disubstituted butene 2

$$X.CH_2.CH=CH.CH_2.X'$$

This reaction is specifically described as follows:

EXAMPLE 10

Proceed as in Example 5, substituting 1,4 dichlorobutene 2 for BB' dichlorethyl ether, in the same molecular proportions.

In the above example, instead of 1,4 dihalogenated butene 2, any member selected from the following list can be employed, using the same molecular proportions and any of the polymers so obtained can be substituted for the polymer of Example 2, Compound B, for incorporation with polymerized butadiene.

Table III

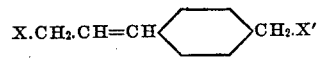

Disubstituted 3 tolyl propene 2

$$X.CH_2.CH=CH.CH_2.CH_2.X'$$

Disubstituted pentene 2

$$X.CH_2.CH=CH.CH_2.CH_2.CH_2.X'$$

Disubstituted hexene 2

$$X.CH_2.CH_2.CH=CH.CH_2.CH_2.CH_2.X'$$

1,7 disubstituted heptene 3

$$X.CH_2.CH_2.CH=CH.CH_2.CH_2.X'$$

1,6 disubstituted hexene 3

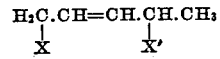

1,4 disubstituted pentene 2

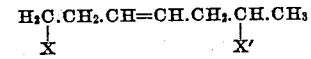

1,6 disubstituted heptene 3

In all of the above compounds there are two carbon atoms joined to and separated by structure characterized by unsaturated hydrocarbons. This is a common quality running through the entire series. To each of the said carbon atoms there is joined a substituent which is spilt off during the reaction.

The compound produced as in Example 10 is substantially a polymer of the unit

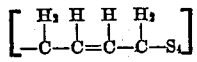

It can be partially desulphurized as taught in Example 8 and converted into a compound which is substantially a polymer of the unit

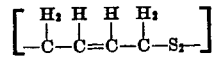

and the latter polymer can also be produced as taught in Example 7, i. e., by the mercaptan reaction, using 1,4 dimercapto butene, 2. Any of the compounds in the above Table III, where X and X' are —SH groups, can be used instead of the dimercapto ethyl ether of Example 7 and the [—RS₂—] polymers so obtained can be substituted for the specific [—RS—] polymers shown in Examples 1 and 3.

*Intervening structure characterized by saturated carbon atoms.*—This is illustrated by the following compound:

$$X.CH_2.CH_2.CH_2.X'$$

Where X and X' are substituents capable of being split off by reaction with an alkaline polysulphide, this compound may be substituted for the ether of Example 5 in the same molecular proportion. The resulting compound is substantially a polymer of the unit $$[-CH_2.CH_2.CH_2-S_4-]$$

It can be partially desulphurized as in Example 8 and converted into a compound which is substantially a polymer of the unit $$[-CH_2.CH_2.CH_2-S_2-]$$

This compound can also be produced by the mercaptan reaction as taught in Example 7.

The tri-, tetra-, penta- and hexasulphides of this group may be substituted for the propylene tetrasulphide of Example 4, Compound B. One of the advantages of such polymers over those obtained from compounds like ethylene or propylene dichloride is freedom from the characteristic disagreeable odor of the latter.

Instead of the specific compound above mentioned others that may be employed are as follows:

$$X.(CH_2)_4.X'$$

$$X(CH_2)_n X'$$

thus producing a series of compounds which are substantially polymers of the unit $$[-(CH_2)_n S_{2 \text{ to } 6}-]$$

where n is greater than 2.

*Intervening structure characterized by aromatic or aryl structure.*—This is illustrated by the following compound:

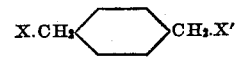

Where X and X' are substituents capable of being split off by reaction with an alkaline polysulphide, this compound may be substituted for the ether of Example 5 in the same molecular proportion. The resulting compound is substantially a polymer of the unit

It may be partially desulphurized as in Example 8 and converted into a polymer which is substantially a polymer of the unit

This compound can be also obtained by the mercaptan reaction as taught in Example 7.

Where X and X' are substituents joined directly to the nucleus of the said intervening aromatic structure, and capable of being split off during reaction with alkaline polysulphide, higher temperatures are necessary, as a rule, than where said substituents are joined to aliphatic carbon atoms. This is illustrated by the following reaction:

EXAMPLE 11

To one liter of 2 molar sodium tetrasulphide add a suspension of Mg(OH)₂ made by dissolving 25 grams of crystallized magnesium chloride in 100 cc. water and adding a solution of 10 grams of NaOH in 50 cc. water. Add about one mol (150 grams) of para dichlor benzene. Place the mixture in an autoclave, preferably provided with a stirrer, and heat to about 300 cc. for about 10 hours. Cool to room temperature and proceed further as taught in previous examples.

Instead of paraxylene dichloride or paradichlorbenzene, other compounds may be selected, as, for example, any of the following: For the reaction with alkaline polysulphide, X and X' are substituents capable of being split off during said reaction. For the mercaptan reaction, X and X' are —SH groups:

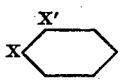

Orthodisubstituted benzene

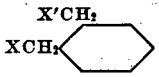

Disubstituted ortho xylene

pp' Disubstituted diethyl benzene

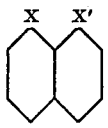

aa' Disubstituted naphthalene

bb' Disubstituted naphthalene

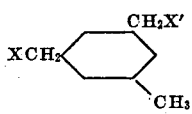

1,3 disubstituted mesitylene

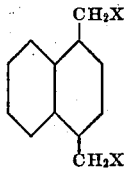

Disubstituted 1,4 dimethyl naphthalene

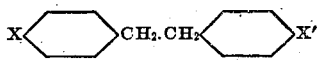

pp' Disubstituted dibenzyl

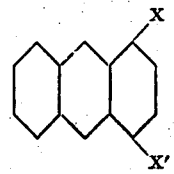

aa' Disubstituted anthracene

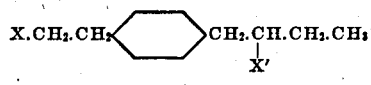

Disubstituted para ethyl butyl benzene

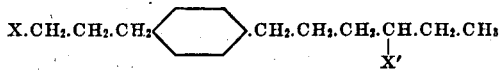

Disubstituted para hexyl propyl benzene

In all of the above examples there are two carbon atoms joined to and separated by aromatic structure or structure characterized by an aromatic or aryl group or groups. This is a common quality running through the entire series.

The tri-, tetra-, penta- and hexasulphide polymers so obtained may be substituted for the specific polymer used in Example 2, Compound B and the disulphide polymer may be substituted for that of Example 1 and Example 3, Compound A, respectively, for incorporation with polymerized butadiene.

Enough illustration has been supplied to make apparent the profound influence of the intervening structure and to make apparent the fact that the invention is not limited to the particular classes specifically mentioned.

As previously mentioned, the curing of the composite product of this invention is aided greatly by an oxidizing agent, also by an organic vulcanization accelerator and an organic acid. Instead of an organic acid as such, a compound capable of yielding such acid, e. g., a nitrile, may be used. Instead of an organic acid, inorganic acids or substances yielding such, e. g., halides (including those of zinc, lead, iron, aluminum, tin, etcetera) and hydrolyzable salts, may be used. It is not the specific structure of the acid but rather a slight acidity under oxidizing conditions, which is conducive to the curing. An organic vulcanization accelerator is also desirable to accelerate the cure.

Instead of polymerized butadiene per se, polymers of other diolefins and other butadienes may be used, e. g. polymers of 2 chloro-butadiene 1, 3 known as chloroprene; 2-methyl butadiene 1, 3 (isoprene); 2,3 dimethyl butadiene 1,3 etcetera.

The term "a polymerized butadiene" or "a polymerized diolefin" includes polymerized butadiene per se, polymerized chloroprene, polymerized isoprene, polymerized methyl isoprene, etc.

This application is a continuation-in-part of my copending application filed May 26, 1934, Ser. No. 727,739, which in turn was copending with my application Ser. No. 627,470 (now United States Patent 1,962,460), filed August 4, 1932.

I claim:

1. A plastic comprising a substance which is substantially a polymer of the unit

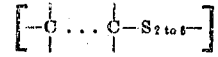

where

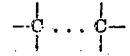

represents carbon atoms joined to and separated by intervening structure and S is a sulphur atom, incorporated with a polymerized butadiene.

2. A plastic comprising a substance which is substantially a polymer of the unit

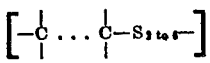

where

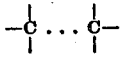

represents carbon atoms joined to and separated by intervening structure and S is a sulphur atom, incorporated with a polymerized butadiene and an oxidizing agent.

3. A plastic comprising a substance which is substantially a polymer of the unit

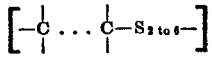

where

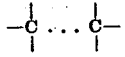

represents carbon atoms joined to and separated by intervening structure and S is a sulphur atom, incorporated with a polymerized butadiene, a metallic oxide and an organic vulcanization accelerator.

4. A plastic comprising a substance which is substantially a polymer of the unit

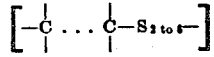

where

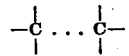

represents carbon atoms joined to and separated by intervening structure and S is a sulphur atom, incorporated with a polymerized butadiene, a metallic oxide, an organic vulcanization accelerator and an organic acid.

5. A plastic comprising a substance which is substantially a polymer of the unit

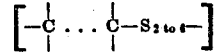

where

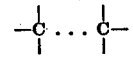

represents carbon atoms joined to and separated by structure characterized by an ether linkage and S is a sulphur atom, incorporated with a polymerized butadiene.

6. A plastic comprising a substance which is substantially a polymer of the unit

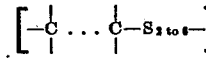

where

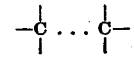

represents carbon atoms joined to and separated by structure characterized by an ether linkage and S is a sulphur atom, incorporated with a polymerized butadiene and an oxidizing agent.

7. A plastic comprising a substance which is substantially a polymer of the unit

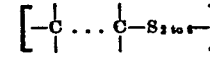

where

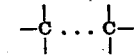

represents carbon atoms joined to and separated by structure characterized by an ether linkage and S is a sulphur atom, incorporated with a polymerized butadiene, a metallic oxide and an organic vulcanization accelerator.

8. A plastic comprising a substance which is substantially a polymer of the unit

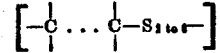

where

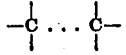

represents carbon atoms joined to and separated by structure characterized by an ether linkage and S is a sulphur atom, incorporated with a polymerized butadiene, a metallic oxide, an organic vulcanization accelerator and an organic acid.

9. A plastic comprising a substance which is substantially a polymer of the unit.

$[-C_2H_4.O.C_2H_4-S_{2\ to\ 6}-]$ where S is a sulphur atom, incorporated with a polymerized butadiene.

10. A plastic comprising a substance which is substantially a polymer of the unit $[-C_2H_4.O.C_2H_4-S_{2\ to\ 6}-]$ where S is a sulphur atom, incorporated with a polymerized butadiene and an oxidizing agent.

11. A plastic comprising a substance which is substantially a polymer of the unit.

$[-C_2H_4.O.C_2H_4-S_{2\ to\ 6}-]$ where S is a sulphur atom, incorporated with a polymerized butadiene, a metallic oxide and an organic vulcanization accelerator.

12. A plastic comprising a substance which is substantially a polymer of the unit $[-C_2H_4.O.C_2H_4-S_{2\ to\ 6}-]$ where S is a sulphur atom, incorporated with a polymerized butadiene, a metallic oxide, an organic vulcanization accelerator and an organic acid.

13. A plastic comprising a substance which is substantially a polymer of the unit

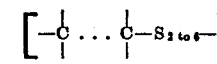

where

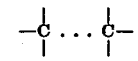

represents carbon atoms joined to and separated by structure characterized by

and S is a sulphur atom, incorporated with a polymerized butadiene.

14. A plastic comprising a substance which is substantially a polymer of the unit

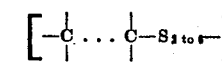

where

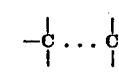

represents carbon atoms joined to and separated by structure characterized by

and S is a sulphur atom, incorporated with a polymerized butadiene and an oxidizing agent.

15. A plastic comprising a substance which is substantially a polymer of the unit

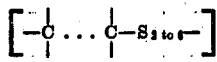

where

represents carbon atoms joined to and separated by structure characterized by

and S is a sulphur atom, incorporated with a polymerized butadiene, a metallic oxide and an organic vulcanization accelerator.

16. A plastic comprising a substance which is substantially a polymer of the unit

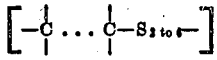

where

represents carbon atoms joined to and separated by structure characterized by

and S is a sulphur atom, incorporated with a polymerized butadiene, a metallic oxide, an organic vulcanization accelerator and an organic acid.

17. A plastic comprising a substance which is substantially a polymer of the unit

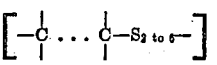

where

represents carbon atoms joined to and separated by aryl structure and S is a sulphur atom, incorporated with a polymerized butadiene.

18. A plastic comprising a substance which is substantially a polymer of the unit

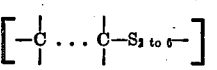

where

represents carbon atoms joined to and separated by aryl structure and S is a sulphur atom, incorporated with a polymerized butadiene and an oxidizing agent.

19. A plastic comprising a substance which is substantially a polymer of the unit

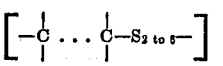

where

represents carbon atoms joined to and separated by aryl structure and S is a sulphur atom, incorporated with a polymerized butadiene, a metallic oxide and an organic vulcanization accelerator.

20. A plastic comprising a substance which is substantially a polymer of the unit

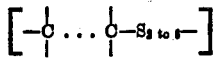

where

represents carbon atoms joined to and separated by aryl structure and S is a sulphur atom, incorporated with a polymerized butadiene, a metallic oxide, an organic vulcanization accelerator and an organic acid.

21. A plastic comprising a substance which is substantially a polymer of the unit

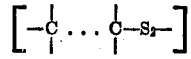

where

represents carbon atoms joined to and separated by intervening structure and S is a sulphur atom, incorporated with a polymerized butadiene.

22. A plastic comprising a substance which is substantially a polymer of the unit

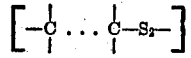

where

represents carbon atoms joined to and separated by intervening structure and S is a sulphur atom, incorporated with a polymerized butadiene and an oxidizing agent.

23. A plastic comprising a substance which is substantially a polymer of the unit

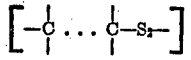

where

represents carbon atoms joined to and separated by intervening structure and S is a sulphur atom, incorporated with a polymerized butadiene, a metallic oxide and an organic vulcanization accelerator.

24. A plastic comprising a substance which is substantially a polymer of the unit

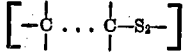

where

represents carbon atoms joined to and separated by intervening structure and S is a sulphur atom, incorporated with a polymerized butadiene, a metallic oxide, an organic vulcanization accelerator and an organic acid.

25. A plastic comprising a substance which is substantially a polymer of the unit

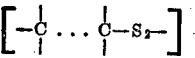

where

represents carbon atoms joined to and separated by structure characterized by an ether linkage and S is a sulphur atom, incorporated with a polymerized butadiene.

26. A plastic comprising a substance which is substantially a polymer of the unit $$\left[-\overset{|}{\underset{|}{C}}\cdots\overset{|}{\underset{|}{C}}-S_x-\right]$$

where $$-\overset{|}{\underset{|}{C}}\cdots\overset{|}{\underset{|}{C}}-$$

represents carbon atoms joined to and separated by structure characterized by $$-\overset{|}{C}=\overset{|}{C}-$$

and S is a sulphur atom, incorporated with a polymerized butadiene.

27. A plastic comprising a substance which is substantially a polymer of the unit $$\left[-\overset{|}{\underset{|}{C}}\cdots\overset{|}{\underset{|}{C}}-S_x-\right]$$

where $$\left[-\overset{|}{\underset{|}{C}}\cdots\overset{|}{\underset{|}{C}}-\right]$$

represents carbon atoms joined to and separated by aryl structure and S is a sulphur atom, incorporated with a polymerized butadiene.

28. A plastic comprising a substance which is substantially a polymer of the unit $$[-C_2H_4.O.C_2H_4-S_2-]$$

incorporated with a polymerized butadiene.

JOSEPH C. PATRICK.